(12) United States Patent
Estevo

(10) Patent No.: US 11,385,205 B2
(45) Date of Patent: Jul. 12, 2022

(54) INSPECTION SYSTEM

(71) Applicant: The Boeing Company, Chicago, IL (US)

(72) Inventor: Curtis R. Estevo, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 691 days.

(21) Appl. No.: 15/435,407

(22) Filed: Feb. 17, 2017

(65) Prior Publication Data

US 2018/0238835 A1 Aug. 23, 2018

(51) Int. Cl.
*G01N 29/28* (2006.01)
*G01N 29/22* (2006.01)
*G01N 29/265* (2006.01)

(52) U.S. Cl.
CPC ........... *G01N 29/28* (2013.01); *G01N 29/225* (2013.01); *G01N 29/265* (2013.01); *G01N 2291/106* (2013.01)

(58) Field of Classification Search
CPC .... G01N 29/28; G01N 29/225; G01N 29/265; G01N 2291/106
USPC .................................................. 73/622, 644
See application file for complete search history.

(56) References Cited

U.S. PATENT DOCUMENTS

| | | | |
|---|---|---|---|
| 3,798,961 A * | 3/1974 | Flambard | G01N 29/28 73/637 |
| 3,958,451 A * | 5/1976 | Richardson | G01N 29/223 73/644 |
| 5,014,711 A * | 5/1991 | Nagasaki | A61B 8/02 600/443 |
| 6,935,178 B2 * | 8/2005 | Prause | G01N 29/225 73/622 |
| 7,392,720 B2 * | 7/2008 | Howarth | G01N 3/48 73/661 |
| 7,743,660 B2 | 6/2010 | Marsh et al. | |
| 9,250,213 B1 | 2/2016 | Bossi et al. | |
| 9,442,096 B2 * | 9/2016 | Fujiwara | G01N 29/043 |
| 2011/0239770 A1 * | 10/2011 | Yamano | G01N 29/262 73/632 |

FOREIGN PATENT DOCUMENTS

EP 2952890 A2 12/2015

* cited by examiner

*Primary Examiner* — Nimeshkumar D Patel
*Assistant Examiner* — Nashmiya S Fayyaz
(74) *Attorney, Agent, or Firm* — Yee & Associates, P.C.

(57) ABSTRACT

An inspection system comprises a sensor array and a fluid chamber. The fluid chamber is configured to provide a fluid coupling environment between the sensor array and a structure. The fluid chamber comprises a bellows having a first side and a second side opposite the first side, wherein the first side is a flexible lip.

20 Claims, 14 Drawing Sheets

INSPECTION SYSTEM

GOVERNMENT LICENSE RIGHTS

This disclosure was made with United States Government support under Contract No. W911W6-13-2-0003 awarded by the United States Department of Defense. The United States Government has certain rights in this disclosure.

BACKGROUND INFORMATION

1. Field

The present disclosure relates generally to inspection systems, and more specifically, to inspection systems using a fluid coupling environment. Still more particularly, the present disclosure relates to systems and methods for providing a fluid chamber between a sensor array and a structure.

2. Background

Non-destructive inspection techniques are used to inspect structures for inconsistencies. Non-destructive inspection techniques do not damage the inspected structures.

Ultrasonic inspection is one form of non-destructive inspection. In ultrasonic inspection, ultrasonic waves are sent through a coupling medium and into the surface of the structure.

When ultrasonic inspections are performed by hand, the coupling medium is a gel. The gel may be undesirably expensive. Additionally, adding and removing the gel may take an undesirably large amount of time. Further, residual gel may be undesirable for the surface characteristics of the structure.

When ultrasonic inspections are performed automatically by an inspection system, the coupling medium is water. To perform an automated inspection, the entire structure to be inspected is submerged in a tank of deionized water. The inspection tanks are large and may be undesirably expensive to maintain. For large structures, such as airplane wings, an inspection tank would necessarily be exceptionally large.

Therefore, it would be desirable to have a method and apparatus that takes into account at least some of the issues discussed above, as well as other possible issues. For example, it would be desirable to have a method and apparatus for ultrasonic inspection of structures without a gel or water tank.

SUMMARY

An illustrative example of the present disclosure provides an inspection system. The inspection system comprises a sensor array and a fluid chamber. The fluid chamber is configured to provide a fluid coupling environment between the sensor array and a structure. The fluid chamber comprises a bellows having a first side and a second side opposite the first side, wherein the first side is a flexible lip.

Another illustrative example of the present disclosure provides an inspection system. The inspection system comprises a sensor array and a fluid chamber containing the sensor array. The fluid chamber comprises a top having a fluid inlet and at least one fluid outlet, a substantially rigid spacer connected to the top, and a corrugated skirt having a flexible lip forming an opening. The spacer is configured to maintain a desired distance between the sensor and a surface of a structure. The corrugated skirt is connected to the spacer. The flexible lip is configured to contact the surface of the structure.

A further illustrative example of the present disclosure provides a method. A force is applied to an inspection system to maintain a flexible lip of a bellows of the inspection system against a surface of a structure. The bellows has a first side and a second side opposite the first side, and the first side comprises the flexible lip. A fluid is flowed into a fluid chamber configured to provide a fluid coupling environment between a sensor array of the inspection system and the surface of the structure while the force is applied to the inspection system. The fluid chamber comprises the bellows. The surface of the structure is inspected using the sensor array.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that there are two conventional methods of inspecting a structure. The illustrative examples recognize and take into account that one method is to submerge the part, which requires a large tank and large volume of water, and some parts are too delicate to submerge. The illustrative examples recognize and take into account that another method is to use a single sensor which reduces the area that can be scanned in a single pass, therefore increasing the time to scan the part.

The illustrative examples recognize and take into account that for a substantially planar structure a stream of water may be directed between an ultrasonic sensor and the structure. The stream of water acts as a fluid coupling environment when the stream of water is continuous and substantially free of bubbles between the sensor and the structure. A fluid coupling environment is also desirably a laminar flow without any discernable gaps between the sensor and the structure.

The illustrative examples recognize and take into account that a stream of water does not act as a fluid coupling environment for curved structures. Curvature of structures introduces gaps between the sensor and the surface of the structure. Thus, the illustrative examples recognize and take into account that an inspection system for ultrasonic inspection of curved structures is desirable.

The illustrative examples recognize and take into account that when using an ultrasonic sensor or sensor array to inspect composite parts, the face of the sensor or array is flat. Often, the composite part being inspected is curved, creating air gaps between the sensor face and the part. The illustrative examples recognize and take into account that for quality inspection, this gap must be filled with a fluid medium, such as gel or water.

The illustrative examples recognize and take into account that parts that have surfaces which are highly variable can only be scanned by sensor arrays when they are totally submerged. The illustrative examples recognize and take into account filling the void between the part and sensor when the part surface is curved creates too big of a void to flood with fluid in space. The illustrative examples recognize and take into account that when using only a water source, most of the water is lost on a highly variable surface. The illustrative examples recognize and take into account that loss of water allows the introduction of air between sensor and part, which results in poor data collection.

Figure 1:
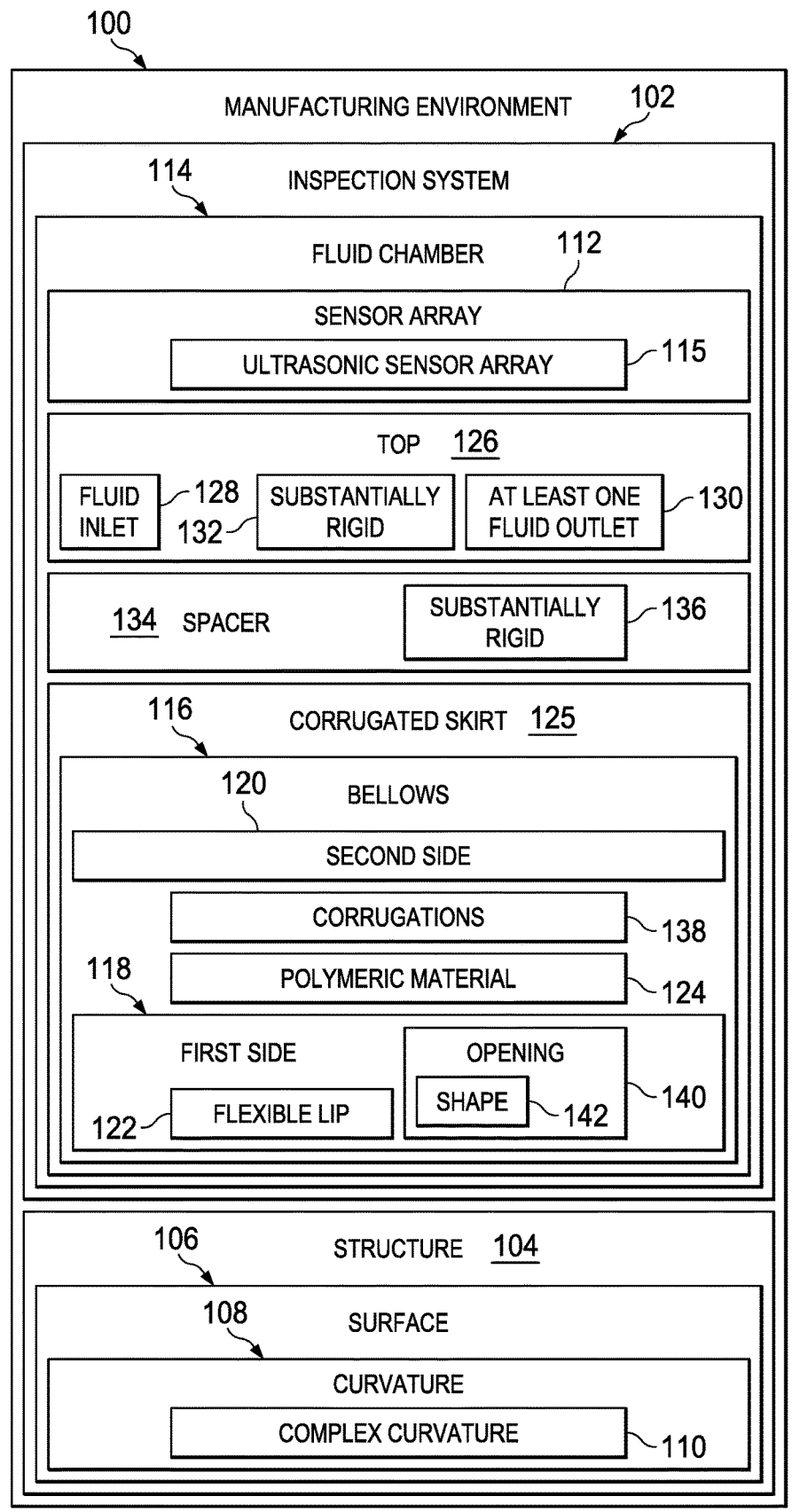
FIG. 1 is an illustration of a block diagram of a manufacturing environment in accordance with an illustrative example.

With reference now to the figures, and in particular, with reference to FIG. 1, an illustration of a block diagram of a manufacturing environment is depicted in accordance with an illustrative example. Manufacturing environment 100 includes inspection system 102 for inspection of structure 104.

Structure 104 has surface 106. In some illustrative examples, surface 106 has curvature 108. In some illustrative examples, curvature 108 is complex curvature 110. Complex curvature 110 is at least one of a varying curvature or a curvature in a plurality of axes.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C; or item B and item C. Of course, any combination of these items may be present. In other examples, "at least one of" may be, for example, without limitation, two of item A, one of item B, and ten of item C; four of item B and seven of item C; or other suitable combinations.

Inspection system 102 comprises sensor array 112 and fluid chamber 114. In some illustrative examples, sensor array 112 takes the form of ultrasonic sensor array 115.

Fluid chamber 114 is configured to provide a fluid coupling environment between sensor array 112 and structure 104. Fluid chamber 114 comprises bellows 116 having first side 118 and second side 120 opposite first side 118. First side 118 comprises flexible lip 122. Bellows 116 is formed of polymeric material 124. In some examples, bellows 116 may instead be referred to as corrugated skirt 125. Flexible lip 122 is configured to deform to seal against surface 106 of structure 104.

Fluid chamber 114 further comprises top 126 connected to second side 120 of bellows 116. Top 126 has fluid inlet 128 and at least one fluid outlet 130. Top 126 is substantially rigid 132, such that a shape of top 126 does not deform due to a force applied to inspection system 102 that deforms bellows 116.

Fluid chamber 114 further comprises spacer 134 configured to maintain a desired distance between sensor array 112 and surface 106 of structure 104. Spacer 134 is substantially rigid 136 to maintain the desired distance between sensor array 112 and surface 106 of structure 104. A portion of spacer 134 extends into bellows 116.

In some illustrative examples, flexible lip 122 is a widest portion of one corrugation of corrugations 138 of bellows 116. In some illustrative examples, flexible lip 122 is configured to deform in at least two axes.

In some illustrative examples, flexible lip 122 is configured to use hydrostatic pressure to provide a force to maintain bellows 116 against surface 106 of structure 104 when fluid is present within bellows 116. In these illustrative examples, hydrostatic pressure is applied to a portion of flexible lip 122 extending inward from bellows 116.

In one example, inspection system 102 comprises sensor array 112 and fluid chamber 114 containing sensor array. Fluid chamber 114 comprises top 126 having fluid inlet 128 and at least one fluid outlet 130, substantially rigid 136 spacer 134 connected to top 126, and corrugated skirt 125 having flexible lip 122 forming opening 140. Spacer 134 is configured to maintain a desired distance between sensor array 112 and surface 106 of structure 104. Corrugated skirt 125 is connected to spacer 134. Flexible lip 122 is configured to contact surface 106 of structure 104.

Flexible lip 122 is configured to deform shape 142 of opening 140 to conform to surface 106 of structure 104. In some illustrative examples, flexible lip 122 is configured to deform shape 142 of opening 140 to conform to surface 106 of structure 104, such that a greater amount of fluid exits fluid chamber 114 through at least one fluid outlet 130 than through opening 140.

Flexible lip 122 is configured to deform to restrict fluid flow between flexible lip 122 and surface 106 of structure 104. Although flexible lip 122 restricts fluid flow, flexible lip 122 may not completely contain fluid within fluid chamber 114. A seal between flexible lip 122 and structure 104 is not necessarily a perfect seal. Fluid may still flow between flexible lip 122 and structure 104. However, flexible lip 122 reduces the amount of fluid flowing out of fluid chamber 114 and across surface 106 of structure 104.

Surface 106 of structure 104 has curvature 108, and flexible lip 122 is configured to continually deform to contact surface 106 as flexible lip 122 moves across surface 106 of structure 104. When curvature 108 is complex curvature 110, flexible lip 122 changes shape as inspection system 102 travels across surface 106. When curvature 108 is a varying curvature, flexible lip 122 deforms continuously to remain contacting surface 106.

Corrugated skirt 125 is removable, such that corrugated skirt 125 is interchangeable with a second corrugated skirt having a different geometry. Geometry of corrugated skirt 125 includes at least one of a quantity of corrugations 138, a size of corrugations 138, shape of corrugations 138, shape 142 of opening 140, or shape of flexible lip 122.

The illustration of manufacturing environment in FIG. 1 is not meant to imply physical or architectural limitations to the manner in which an illustrative example may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative example.

For example, a material of bellows 116 is not depicted in FIG. 1. However, bellows 116 may be formed of any desirable flexible material. In some illustrative examples, bellows 116 may desirably be formed of a polymeric material.

Further, manufacturing equipment for forming bellows 116 is not depicted in FIG. 1. Bellows 116 may be formed using any desirable manufacturing method. In some illustrative examples, bellows 116 may be formed using injection molding or any other desirable form of molding. In another illustrative example, bellows 116 may be formed using three-dimensional manufacturing, such as three-dimensional printing.

Figure 2:
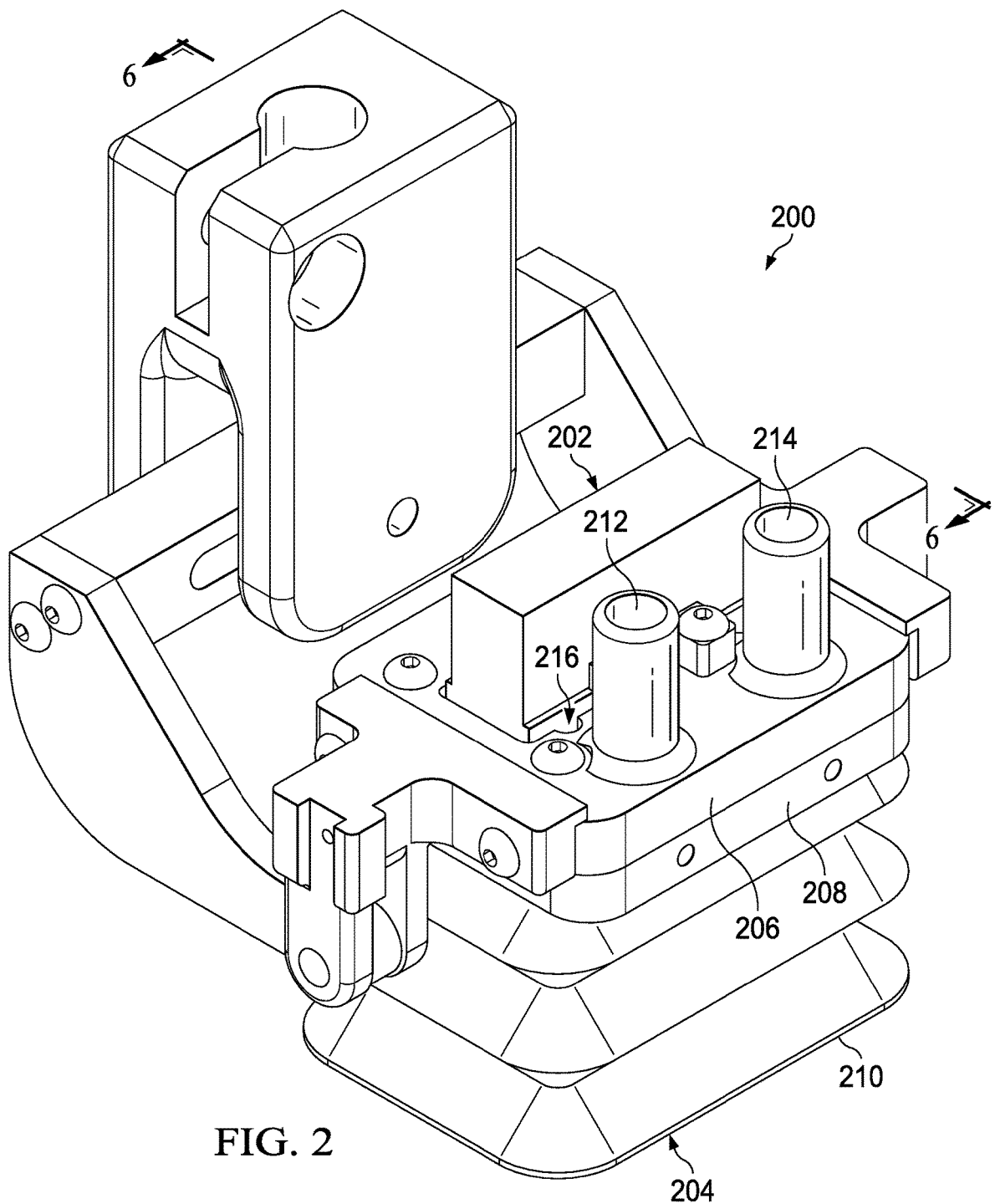
FIG. 2 is an illustration of an isometric view of an inspection system in accordance with an illustrative example.

Turning now to FIG. 2, an illustration of an isometric view of an inspection system is depicted in accordance with an illustrative example. Inspection system 200 is a physical implementation of inspection system 102 of FIG. 1. Inspection system 200 comprises sensor array 202 and fluid chamber 204. Fluid chamber 204 provides a fluid coupling environment between sensor array 202 and a structure. The fluid coupling environment includes fluid without an undesirable amount of bubbles or cavitation. The fluid within the fluid coupling environment has laminar flow. Fluid chamber 204 comprises top 206, spacer 208, and bellows 210. Bellows 210 may also be referred to as a corrugated skirt.

Sensor array 202 is connected to and extends through top 206 into fluid chamber 204. Spacer 208 is substantially rigid. A portion of spacer 208 extends into bellows 210. Spacer 208 maintains a desired distance between a surface of a structure to be inspected and sensor array 202.

Top 206 has fluid inlet 212, fluid inlet 214, and fluid outlets 216. Fluid is introduced into fluid chamber 204 through fluid inlet 212 and fluid inlet 214. Fluid exits fluid chamber 204 through fluid outlets 216 and between bellows 210 and the structure. In some illustrative examples, bellows 210 deforms such that a majority of the fluid exits through fluid outlets 216. Fluid flow between bellows 210 and the structure is reduced by deformation of bellows 210.

Figure 3:
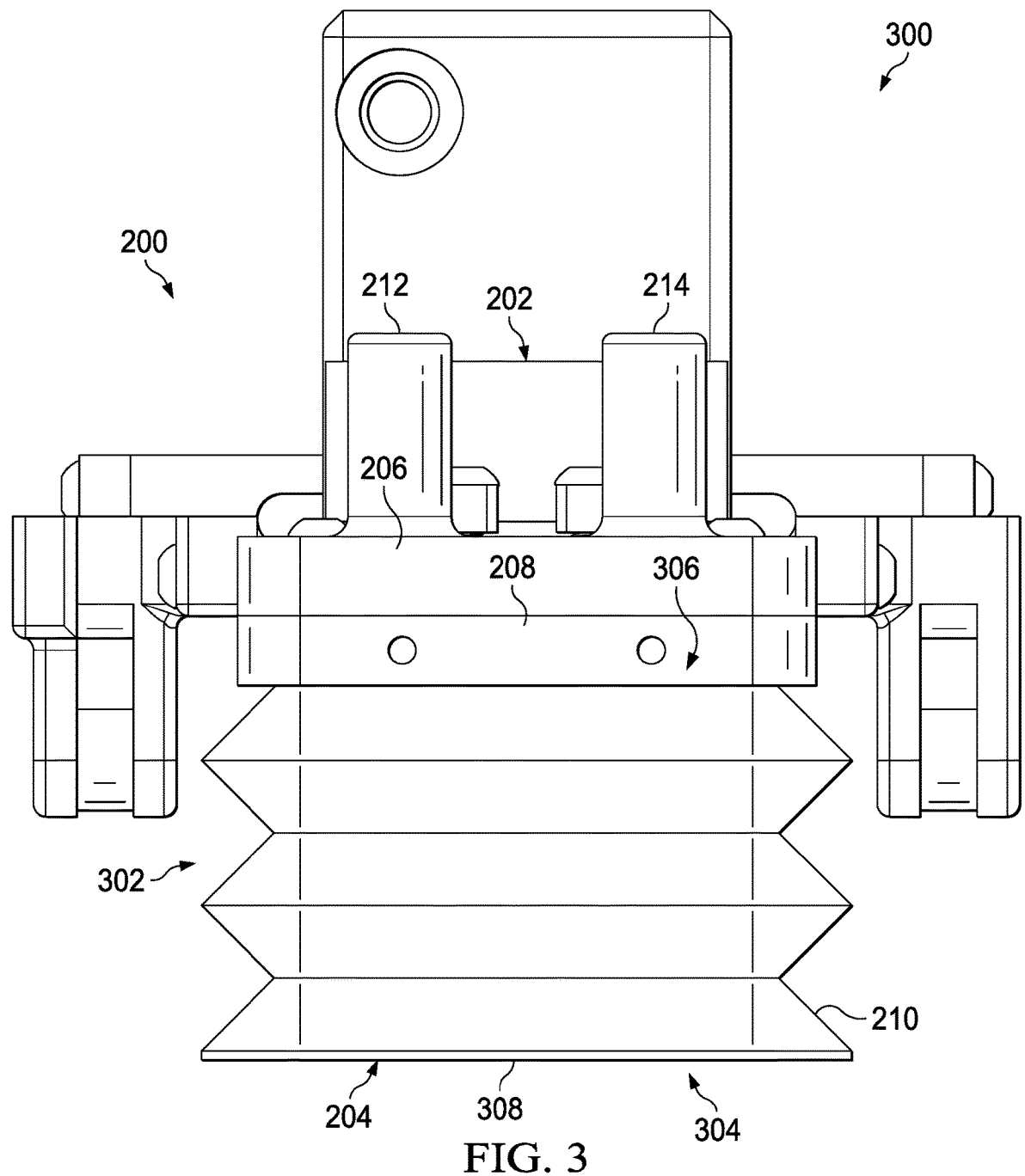
FIG. 3 is an illustration of a front view of an inspection system in accordance with an illustrative example.

Turning now to FIG. 3, an illustration of a front view of an inspection system is depicted in accordance with an illustrative example. View 300 is a front view of inspection system 200. As can be seen in view 300, bellows 210 has corrugations 302. In this illustrative example, bellows 210 has two and a half corrugations. Bellows 210 has first side 304 and second side 306. First side 304 comprises flexible lip 308. Flexible lip 308 is configured to contact a surface of a structure to be inspected. Second side 306 is opposite first side 304. Second side 306 is connected to spacer 208.

As can be seen in view 300, inspection system 200 is an end effector. An end effector is a device attached to a robotic arm. Use of inspection system 200 may be completely automated or semi-automated.

Figure 4:
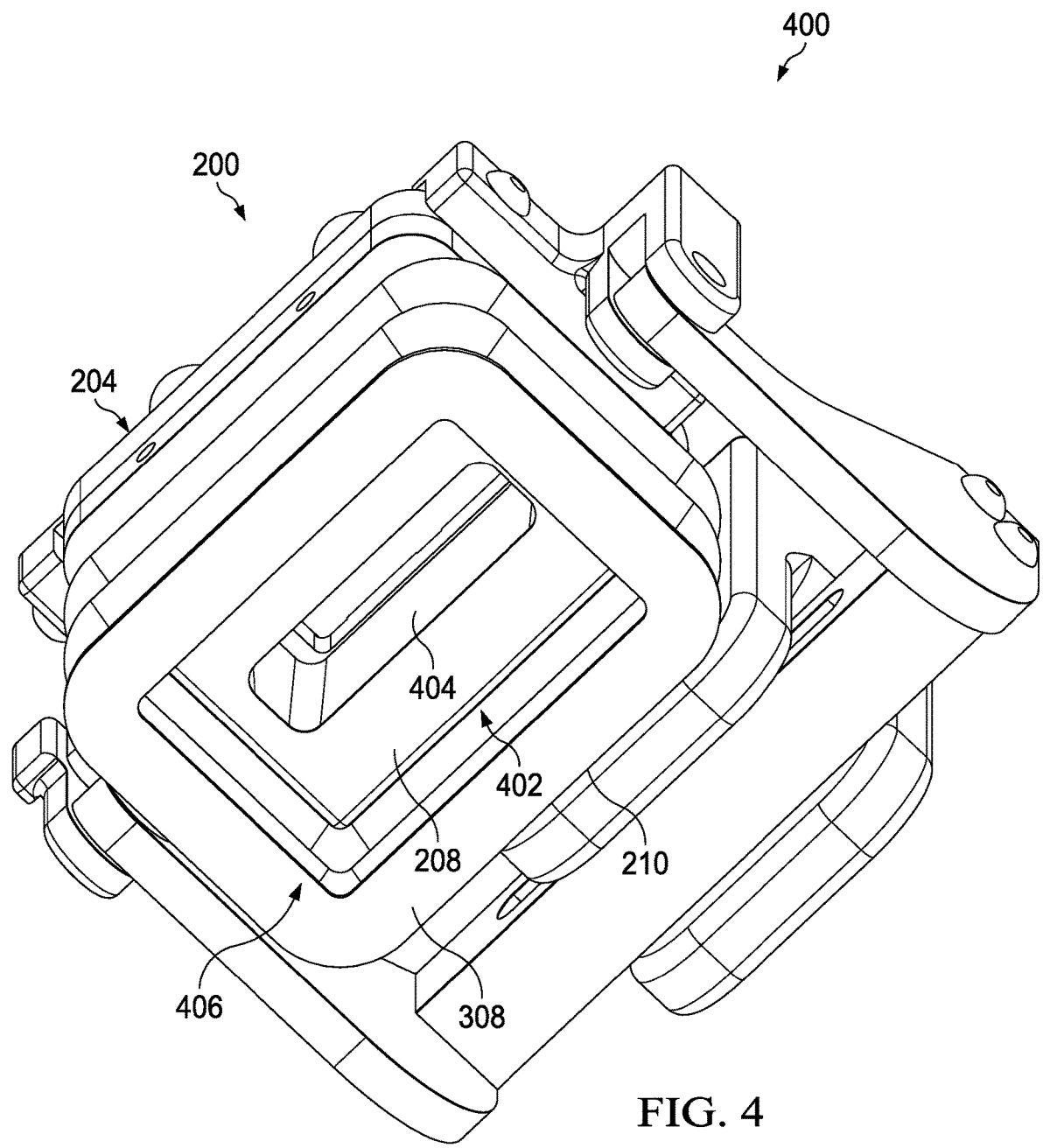
FIG. 4 is an illustration of a bottom view of an inspection system in accordance with an illustrative example.

Turning now to FIG. 4, an illustration of a bottom view of an inspection system is depicted in accordance with an illustrative example. View 400 is a bottom view of inspection system 200. As can be seen in view 400, portion 402 of spacer 208 extends through bellows 210. In view 400, spacer 208 does not have any standoffs. Instead, spacer 208 is substantially planar.

In other non-depicted illustrative examples, a spacer in inspection system 200 may have a number of standoffs extending out from the substantially planar surface of spacer 208. As used herein, "a number of" when used with reference to items means one or more items. Thus, a number of standoffs means one or more standoffs. Standoffs (not depicted) help to passively align the face of sensor array 202, shown in FIG. 2, perpendicular to a curved surface of a structure.

In view 400, a portion of sensor array 202 is visible through hole 404 of spacer 208. When fluid is introduced between sensor array 202 and a structure, fluid fills hole 404 of spacer 208. The fluid will also fill bellows 210.

As can be seen in view 400, flexible lip 308 forms opening 406. Flexible lip 308 is configured to deform a shape of opening 406 to conform to a surface of a structure. In some illustrative examples, flexible lip 308 is configured to deform the shape of opening 406 to conform to a surface of a structure, such that a greater amount of fluid exits fluid chamber 204 through at least one fluid outlet than through opening 406.

Figure 5:
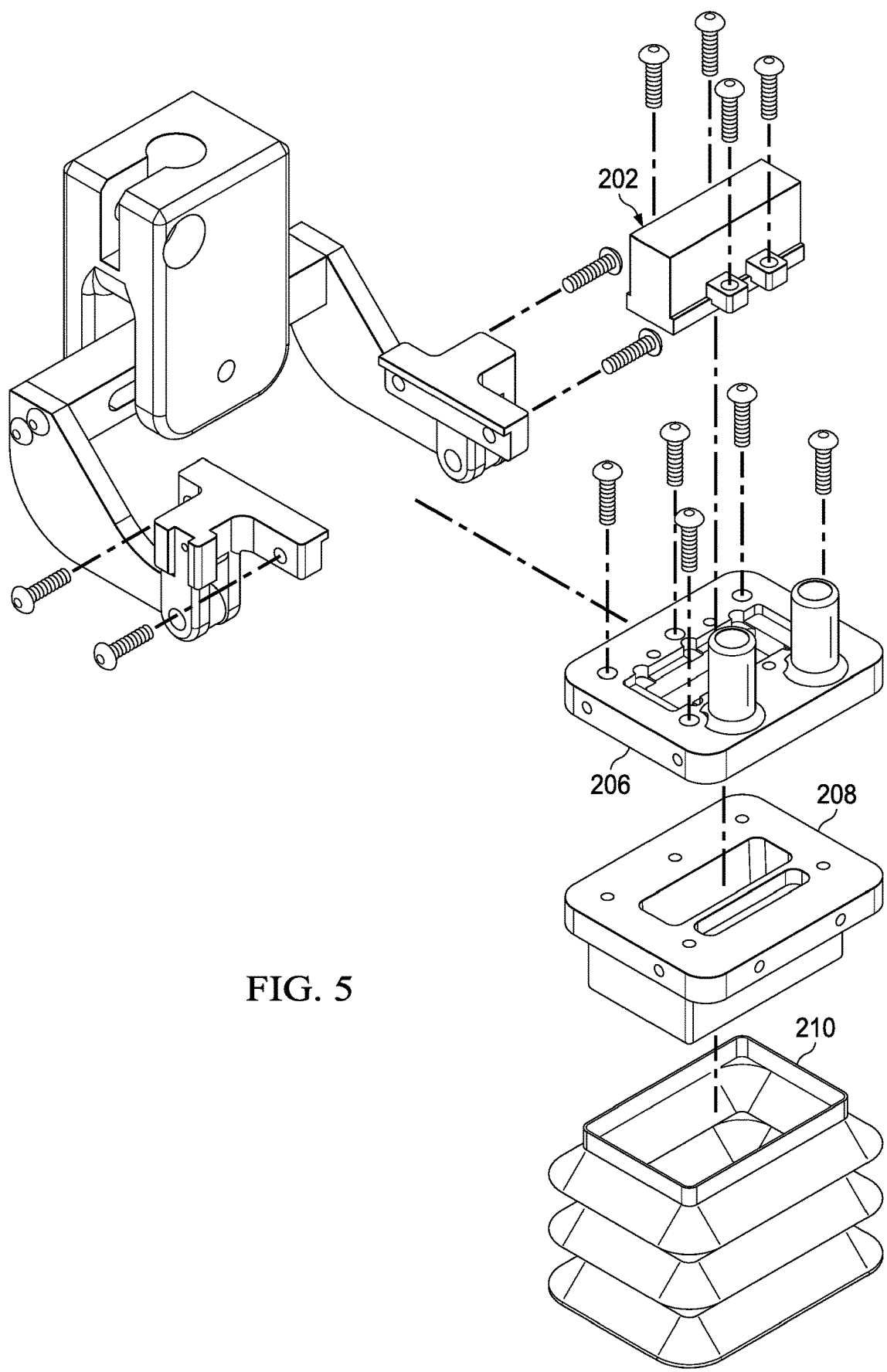
FIG. 5 is an illustration of an exploded view of an inspection system in accordance with an illustrative example.

Turning now to FIG. 5, an illustration of an exploded view of an inspection system is depicted in accordance with an illustrative example. View 500 is an exploded view of inspection system 200 of FIG. 2. As can be seen in view 500, sensor array 202 is connected to and partially extends through top 206. In operation, top 206 is connected to spacer 208, and spacer 208 is connected to bellows 210. In operation, fluid flowing between sensor array 202 and a structure will be contained within fluid chamber 204 formed by top 206, spacer 208, and bellows 210.

Figure 6:
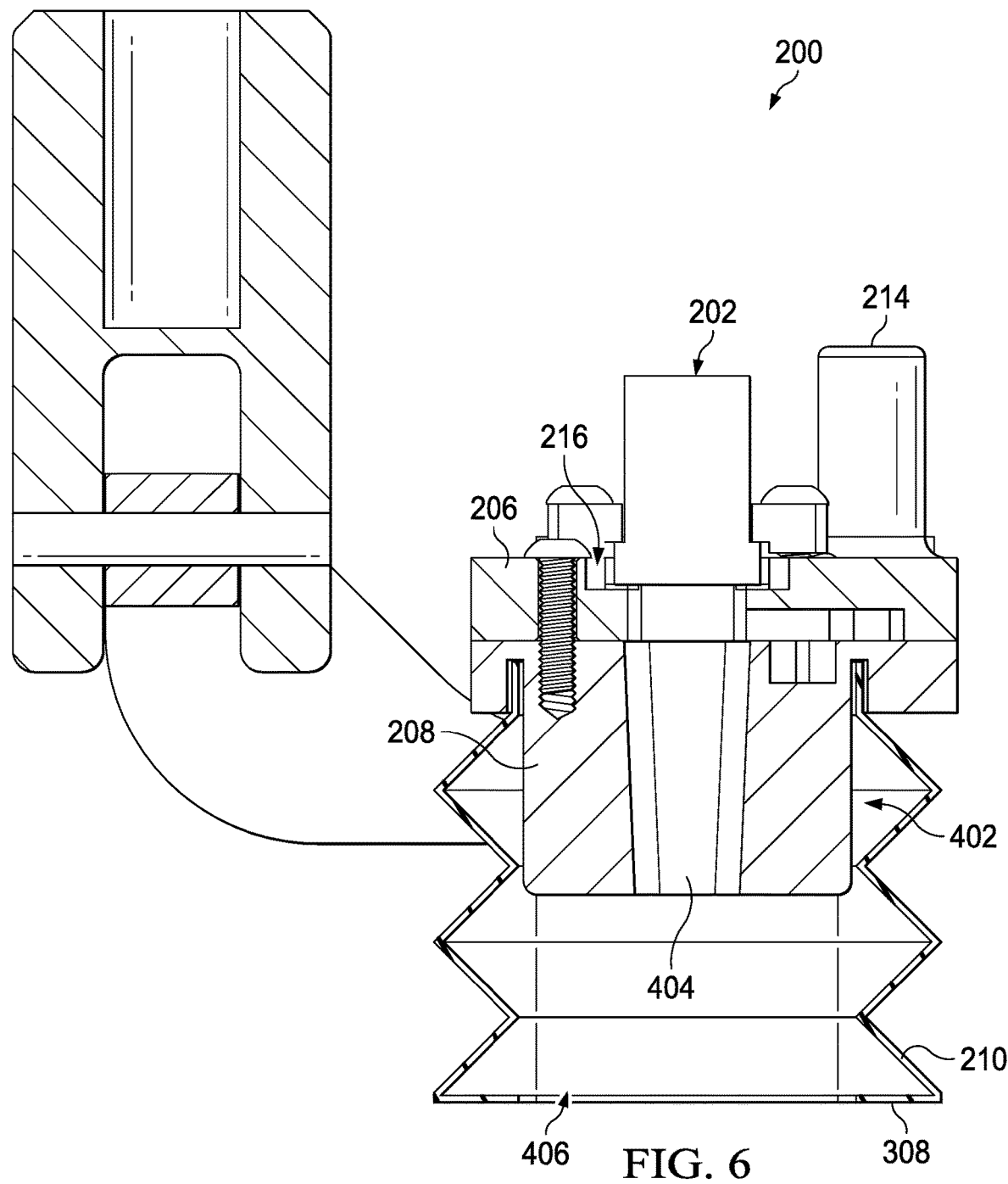
FIG. 6 is an illustration of a cross-sectional view of an inspection system in accordance with an illustrative example.

Turning now to FIG. 6, an illustration of a cross-sectional view of an inspection system is depicted in accordance with an illustrative example. View 600 is a cross-sectional view of inspection system 200 of FIG. 2. During inspection of a structure, bellows 210 is compressed by a force downward on inspection system 200. Bellows 210 will be compressed until flexible lip 308 is substantially even with end 602 of spacer 208. When spacer 208 has standoffs, bellows 210 is compressed until flexible lip 308 is substantially even with the end of the standoffs.

Figure 7:
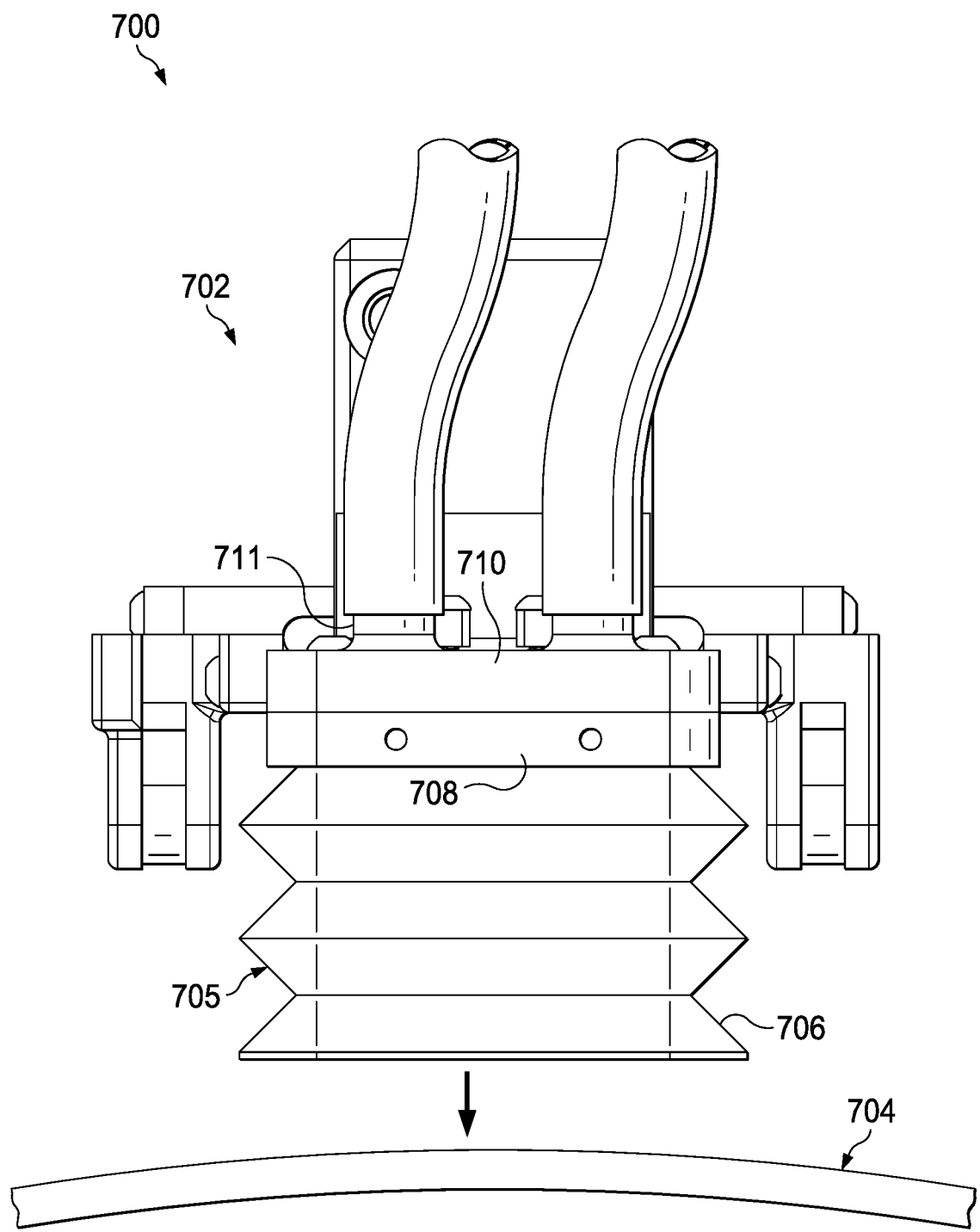
FIG. 7 is an illustration of an inspection system over a structure to be inspected in accordance with an illustrative example.

Turning now to FIG. 7, an illustration of an inspection system over a structure to be inspected is depicted in accordance with an illustrative example. In view 700, inspection system 702 is positioned over structure 704. Inspection system 702 is a physical implementation of inspection system 102 of FIG. 1. In some illustrative examples, inspection system 702 is substantially the same as inspection system 200 of FIG. 2.

Inspection system 702 comprises a sensor array (not depicted) and fluid chamber 705. Fluid chamber 705 is configured to provide a fluid coupling environment for the sensor array. Fluid chamber 705 includes bellows 706, spacer 708, and top 710. Top 710 has at least one fluid outlet 711 for fluid to exit fluid chamber 705.

Characteristics of inspection system 702 may be changed by exchanging components of inspection system 702. For example, inspection system 702 may be changed by exchanging bellows 706 for another interchangeable bellows. At least one of the material or shape or size of bellows 706, including the shape and size of the corrugations and the shape and size of the flexible lip, affects the deformation of bellows 706. The deformation of bellows 706 affects the sealing of the flexible lip and the behavior of the fluid within fluid chamber 705.

Inspection system 702 may also be altered by changing spacer 708 for a spacer with different dimensions or a different number of spacers. Inspection system 702 may be changed by changing the sensor array (not depicted) within inspection system 702.

Figure 8:
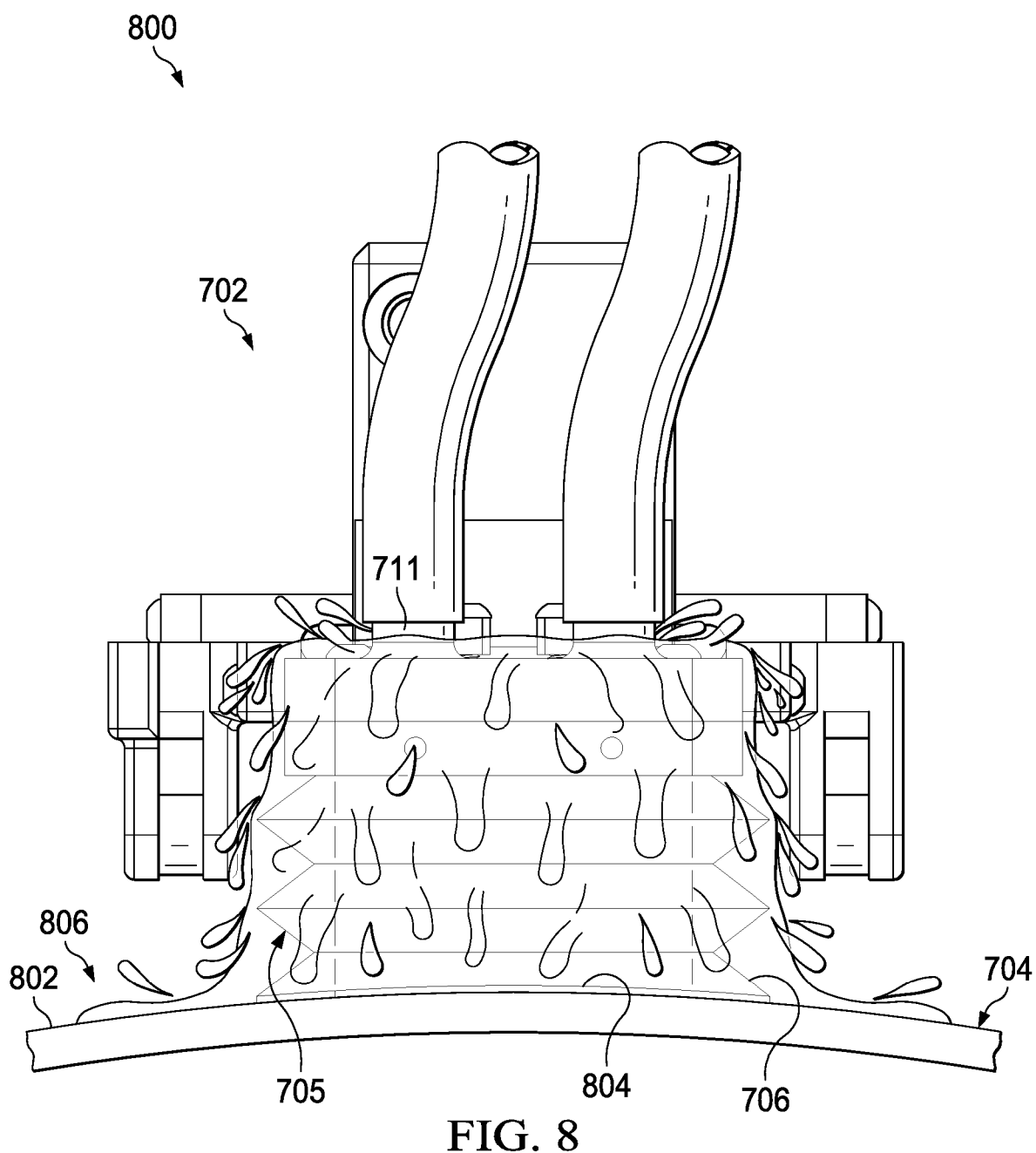
FIG. 8 is an illustration of an inspection system contacting a structure to be inspected in accordance with an illustrative example.

Turning now to FIG. 8, an illustration of an inspection system contacting a structure to be inspected is depicted in accordance with an illustrative example. View 800 is a view of inspection system 702 of FIG. 7 contacting surface 802 of structure 704. As depicted, bellows 706 deforms such that flexible lip 804 of bellows 706 substantially conforms to curvature 806 of surface 802 of structure 704.

Flexible lip 804 encircles an opening of inspection system 702. Flexible lip 804 deforms the shape of the opening to conform to surface 802 of structure 704, such that a greater amount of fluid exits fluid chamber 705 through at least one fluid outlet 711 than through the opening.

Flexible lip 804 deforms to restrict fluid flow between flexible lip 804 and surface 802 of structure 704. Although flexible lip 804 may not keep all fluid from flowing between flexible lip 804 and surface 802, less fluid flows between flexible lip 804 and surface 802 than between a rigid lip and surface 802. Deformation of flexible lip 804 reduces the amount of fluid flowing out of the opening. However, fluid flow out of fluid chamber 705, either via at least one fluid outlet 711 or between flexible lip 804 and structure 704, removes air bubbles that may be present in the fluid or that may form.

Surface 802 of structure 704 has a curvature, and flexible lip 804 continually deforms to contact surface 802 as flexible lip 804 moves across surface 802 of structure 704. As depicted, structure 704 has a variable curvature.

Figure 9:
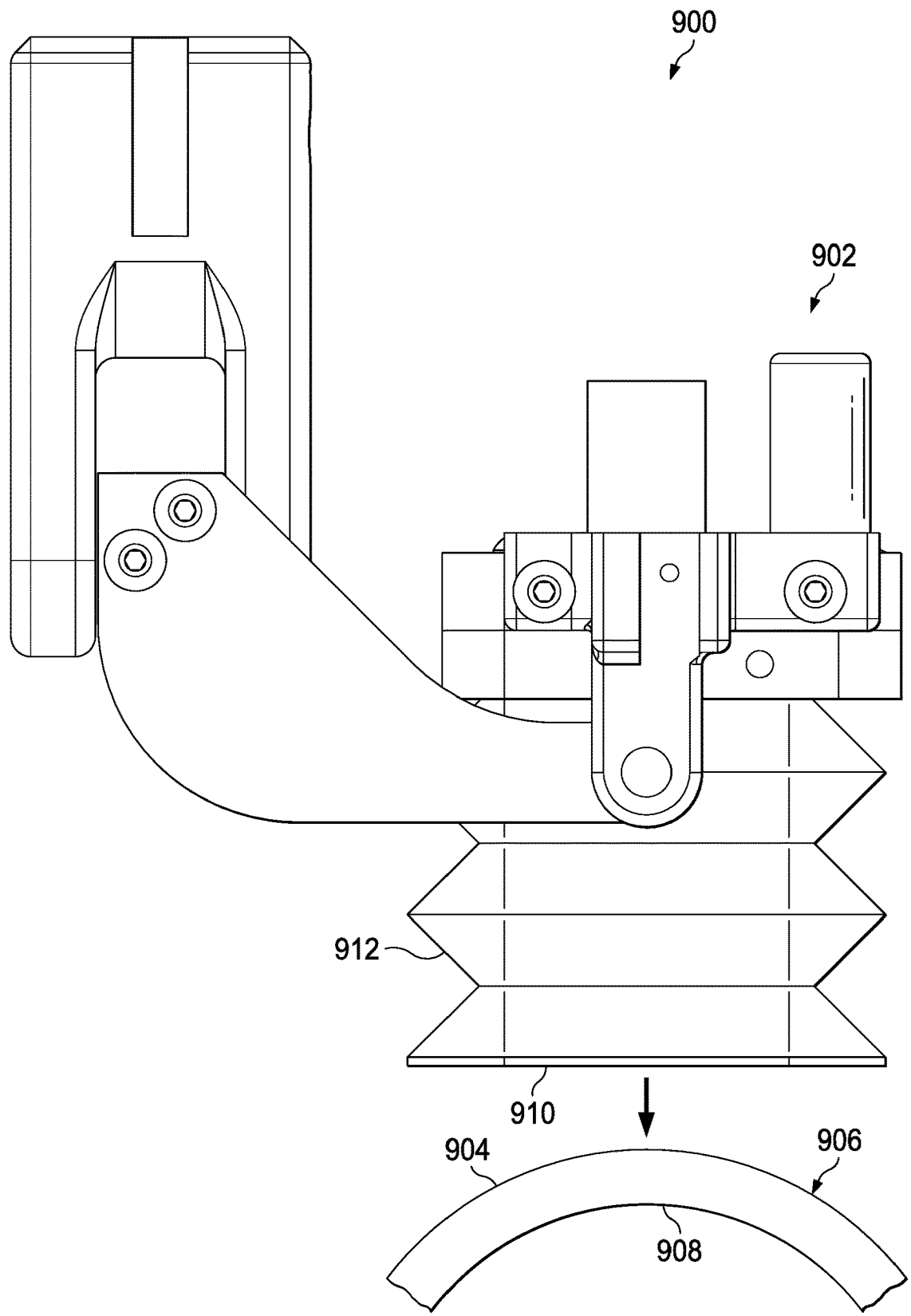
FIG. 9 is an illustration of an inspection system over a structure to be inspected in accordance with an illustrative example.

Turning now to FIG. 9, an illustration of an inspection system over a structure to be inspected is depicted in accordance with an illustrative example. View 900 is a view of inspection system 902 contacting surface 904 of structure 906 prior to an application of downward force on inspection system 902. Inspection system 902 is a physical implementation of inspection system 102 of FIG. 1. Structure 906 is a physical implementation of structure 104 of FIG. 1. As depicted, structure 906 has curvature 908. More specifically, as depicted, structure 906 is substantially cylindrical.

In view 900, flexible lip 910 of bellows 912 is not yet deformed. View 900 is a view of inspection system 902 prior to or following inspection of structure 906.

Figure 10:
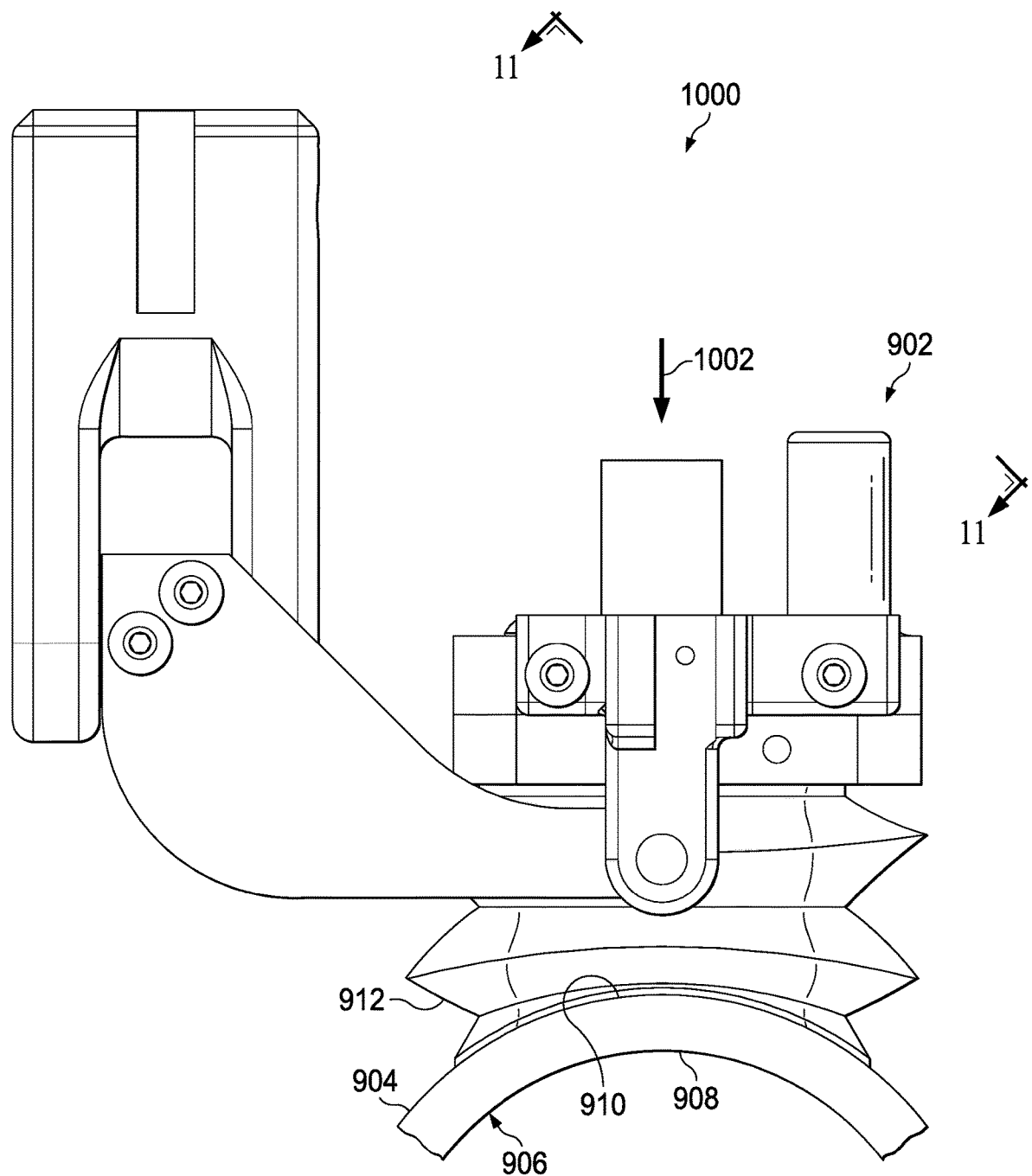
FIG. 10 is an illustration of a front view of an inspection system contacting a structure to be inspected in accordance with an illustrative example.

Turning now to FIG. 10, an illustration of a front view of an inspection system contacting a structure to be inspected is depicted in accordance with an illustrative example. View 1000 is a view of inspection system 902 with a force applied to inspection system 902 in direction 1002 towards structure 906. As depicted, flexible lip 910 of bellows 912 is deformed to seal against surface 904 of structure 906.

Figure 11:
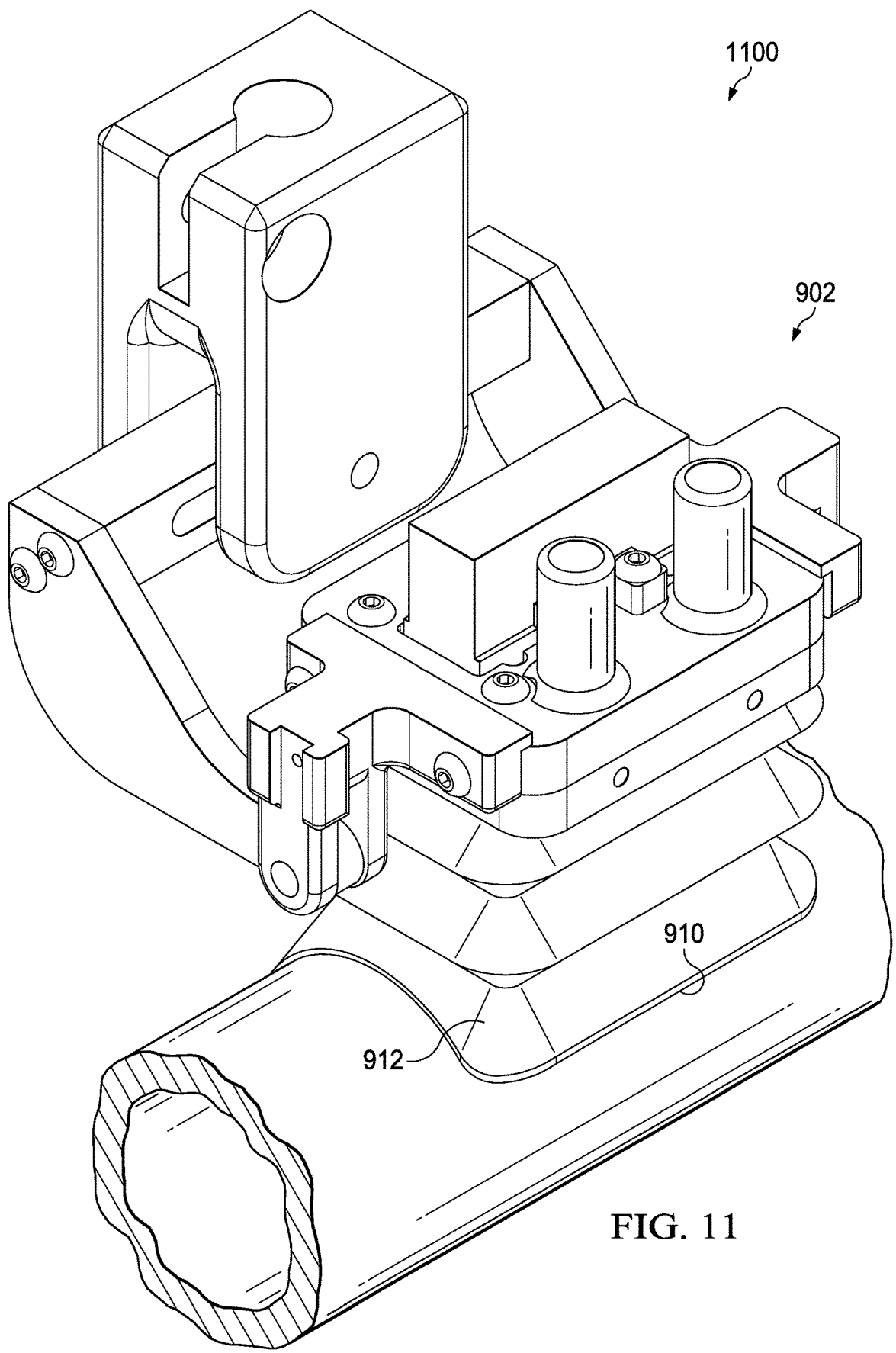
FIG. 11 is an illustration of an isometric view of an inspection system contacting a structure to be inspected in accordance with an illustrative example.

Turning now to FIG. 11, an illustration of an isometric view of an inspection system contacting a structure to be inspected is depicted in accordance with an illustrative example. View 1100 is a view of inspection system 902 from direction 11 of FIG. 10. View 1100 shows deformation of bellows 912 due to a force applied to inspection system 902 in direction 1002 of FIG. 10.

Figure 12:
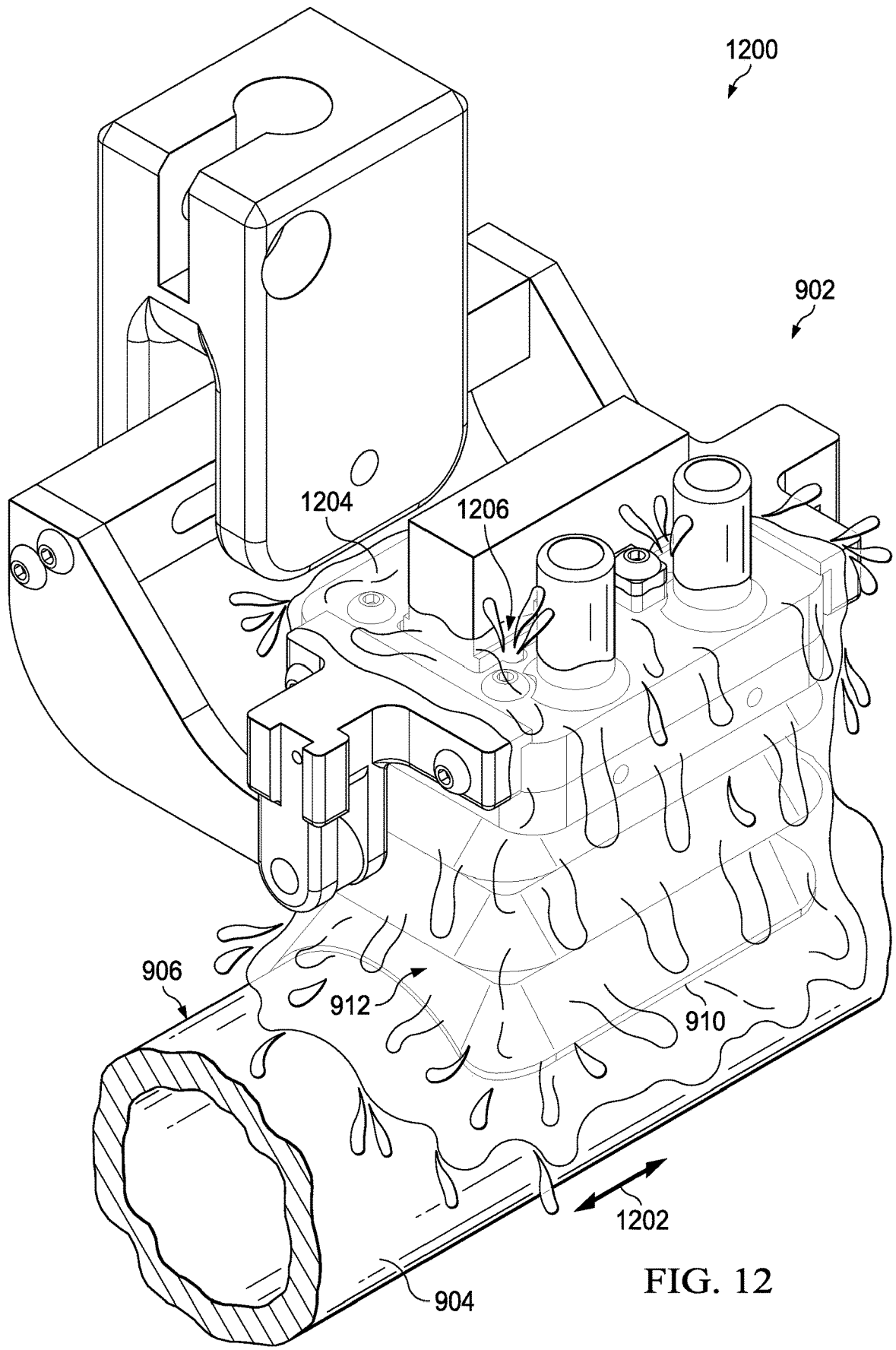
FIG. 12 is an illustration of an isometric view of an inspection system contacting a structure to be inspected in accordance with an illustrative example.

Turning now to FIG. 12 is an illustration of an isometric view of an inspection system contacting a structure to be inspected is depicted in accordance with an illustrative example. View 1200 is a view of inspection system 902 during an inspection of structure 906. Inspection system 902 is moved along surface 904 of structure 906 in direction 1202 to inspect surface 904.

Flexible lip 910 of bellows 912 conforms to surface 904 of structure 906, forcing fluid out of top 1204 rather than allowing it to flow out around structure 906. More specifically, flexible lip 910 of bellows 912 deforming to seal against surface 904 of structure 906 directs fluid out of number of fluid outlets 1206. The amount of fluid flowing between flexible lip 910 and surface 904 is reduced by deformation of flexible lip 910. Thus, flexible lip 910 restricts fluid flow between flexible lip 910 and structure 906.

Figure 13:
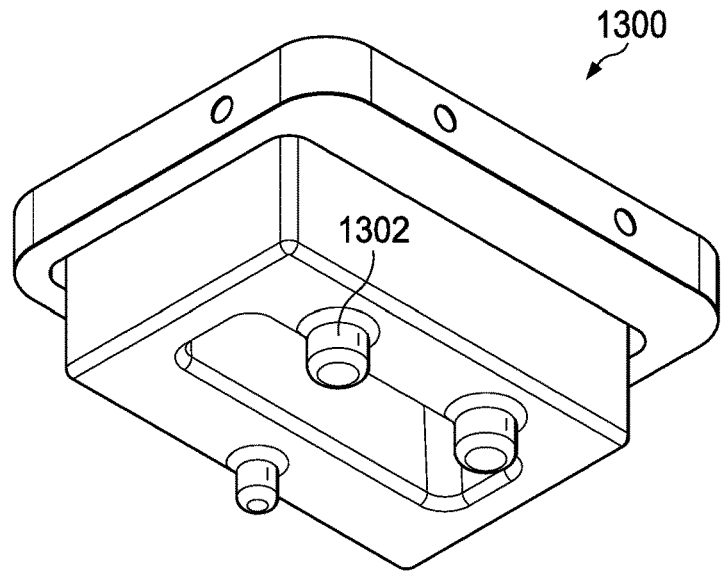
FIG. 13 is an illustration of an isometric view of a spacer in accordance with an illustrative example.

Turning now to FIG. 13, an illustration of an isometric view of a spacer is depicted in accordance with an illustrative example. Spacer 1300 is a physical implementation of spacer 134 of FIG. 1. Spacer 1300 may be an implementation of spacer 208 of FIG. 2.

As depicted, spacer 1300 has standoffs 1302. Standoffs 1302 help to passively align a sensor array face perpendicular to a curved part face to be inspected. As depicted, standoffs 1302 include three standoffs. However, the number, location, and size of standoffs 1302 may be different for different designs of spacer 1300.

Figure 14:
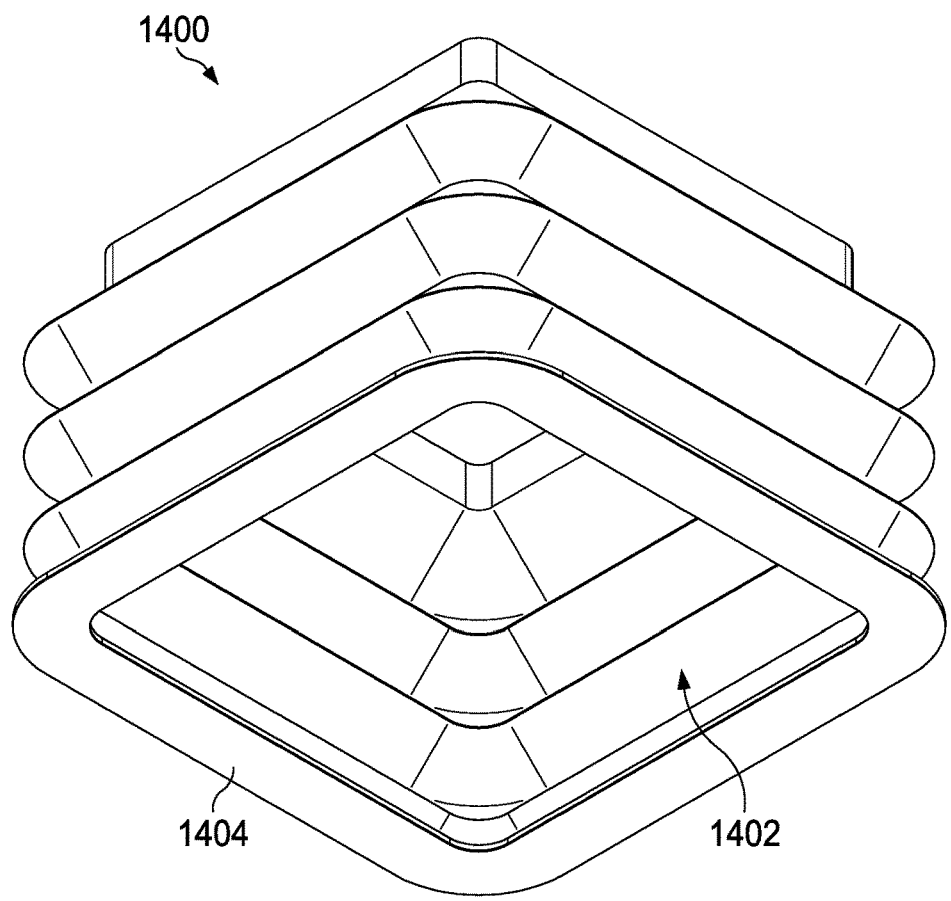
FIG. 14 is an illustration of an isometric view of an interchangeable bellows in accordance with an illustrative example.
Figure 15:
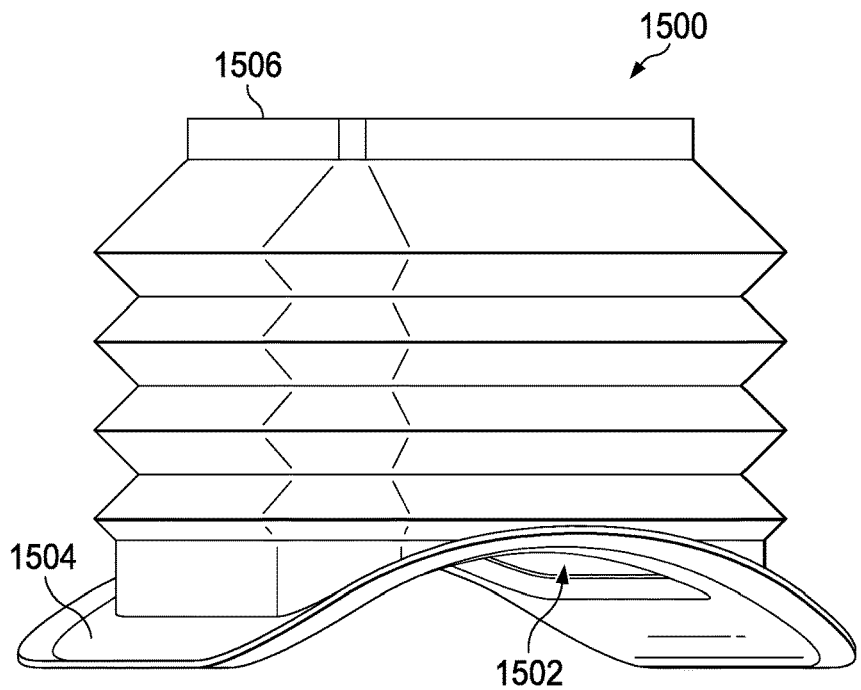
FIG. 15 is an illustration of an isometric view of an interchangeable bellows in accordance with an illustrative example.

FIGS. 14-15 illustrate different designs for physical implementations of bellows 116 of FIG. 1. A bellows design may be varied by featuring different sized corrugations, lips with flanges to help prevent the lip from folding under itself, and a curved lip surface for high radius areas. FIGS. 14-15 are non-limiting examples as the number of corrugations, size of corrugations, shape of bellows, shape of lip, size of lip, and other features of the bellows may be changed based on at least one of characteristics of the surface of the structure to be inspected, fluid pressure, material of the bellows, shape of the sensor, or any other characteristic of the inspection.

Turning now to FIG. 14, an illustration of an isometric view of an interchangeable bellows is depicted in accordance with an illustrative example. Bellows 1400 is a physical implementation of bellows 116 of FIG. 1. Bellows 1400 may be used to replace bellows 210 in inspection system 200 of FIG. 2. Bellows 210 may be interchangeable with bellows 1400 of FIG. 14.

Bellows 1400 has three full corrugations and one partial corrugation. The partial corrugation is less than a half corrugation. As depicted, opening 1402 formed by flexible lip 1404 is substantially square.

Turning now to FIG. 15, an illustration of an isometric view of an interchangeable bellows is depicted in accordance with an illustrative example. Bellows 1500 is a physical implementation of bellows 116 of FIG. 1. Bellows 1500 may be used to replace bellows 210 in inspection system 200 of FIG. 2. Bellows 210 may be interchangeable with bellows 1500 of FIG. 15.

Bellows 1500 has three full corrugations and one partial corrugation. The partial corrugation is greater than one half corrugation. As depicted, opening 1502 formed by flexible lip 1504 is not planar. Instead, flexible lip 1504 is curved inwards towards second side 1506 of bellows 1500 opposite flexible lip 1504.

Bellows 1500 may be used to inspect components with extreme curvatures. For example, bellows 1500 may be used on a cylinder with a relatively small diameter.

The different components shown in FIGS. 2-15 may be combined with components in FIG. 1, used with components in FIG. 1, or a combination of the two. Additionally, some of the components in FIGS. 2-15 may be illustrative examples of how components shown in block form in FIG. 1 can be implemented as physical structures.

Figure 16:
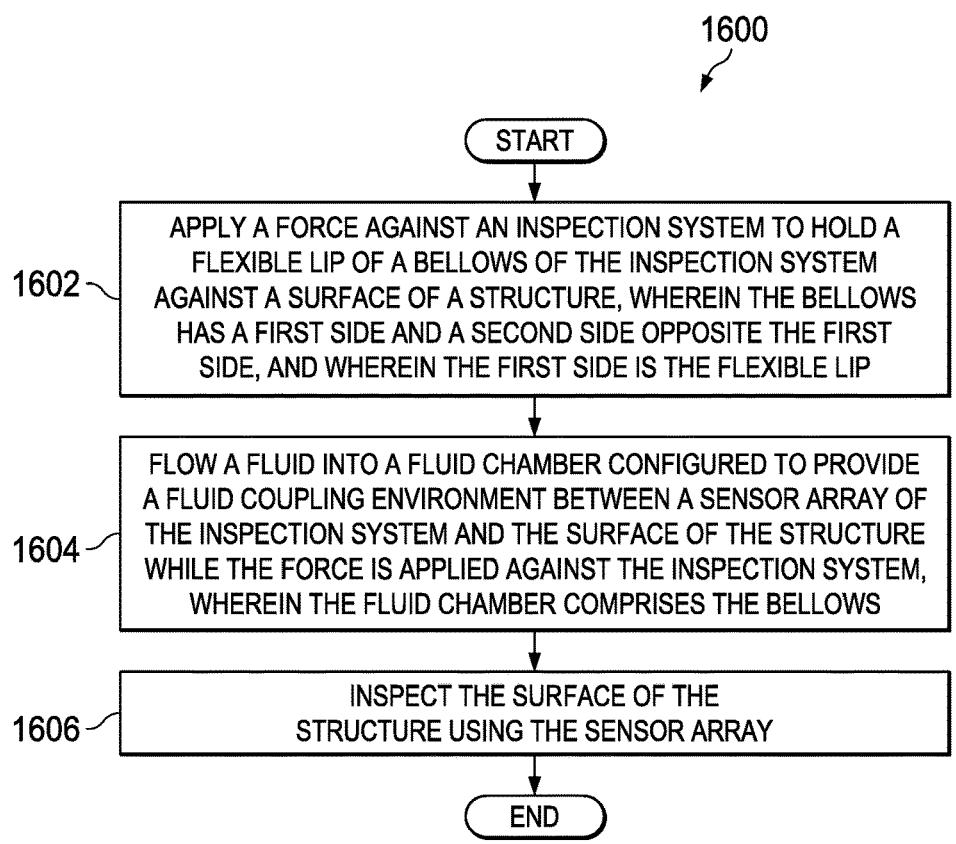
FIG. 16 is an illustration of a flowchart of a method for inspecting a surface of a structure in accordance with an illustrative example.

Turning now to FIG. 16, an illustration of a flowchart of a method for inspecting a surface of a structure is depicted in accordance with an illustrative example. Method 1600 may be used to inspect structure 104 using inspection system 102 of FIG. 1. Method 1600 may be used by inspection system 200 of FIGS. 2-12.

Method 1600 applies a force to an inspection system to maintain a flexible lip of a bellows of the inspection system against a surface of a structure, wherein the bellows has a first side and a second side opposite the first side, and wherein the first side comprises the flexible lip (operation 1602). In some illustrative examples, applying the force to the inspection system deforms the flexible lip of the bellows to seal the fluid chamber against the structure. In some illustrative examples, applying the force to the inspection system deforms the flexible lip to restrict fluid flow between the flexible lip and the surface of the structure such that a greater amount of fluid exits the fluid chamber through at least one fluid outlet of a top of the fluid chamber than between the flexible lip and the surface of the structure.

Method 1600 flows a fluid into a fluid chamber configured to provide a fluid coupling environment between a sensor array of the inspection system and the surface of the structure while the force is applied to the inspection system, wherein the fluid chamber comprises the bellows (operation 1604). Method 1600 inspects the surface of the structure using the sensor array (operation 1606). Afterwards the method terminates.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, method 1600 may move the inspection system along the surface of the structure, wherein at least one of applying the force to the inspection system or hydrostatic force of the fluid flowing within the fluid chamber maintains contact between the flexible lip and the surface of the structure. In some illustrative examples, the surface of the structure has a variable curvature and the flexible lip of the bellows changes shape as the bellows moves across the surface of the structure.

The illustrative examples provide an inspection system and method for inspecting structures with curvatures, without using gel or being submerged in a tank. The illustrative examples provide a means of reducing the time to inspect composite parts without the need for large submersion tanks. These tanks are expensive to build, maintain, and require a large footprint.

The illustrative examples provide a means of filling that void without having to totally submerge the part. The illustrative examples provide a skirt that is flexible, fits around a sensor or sensor array, and has a lip that conforms to the surface of part. This creates a chamber around the sensor or array that can be filled with fluid.

The skirt is a flexible structure designed specifically to conform to a surface with variable curves, but be laterally rigid enough to travel with the rigid sensor as it is traversed across the part surface. Different skirt geometries may conform to different surface curvatures.

In some illustrative examples, the skirt is three-dimensionally printed. Being three-dimensionally printed means that this skirt can be customized to fit any sensor array. The corrugations on the side load up like a compression spring forcing the lip of the skirt to conform to the part surface. These corrugations also provide rigidity in the transverse directions so the skirt doesn't fold over as it slides across the part surface.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An inspection system comprising:
   a sensor array; and
   a fluid chamber configured to provide a fluid coupling environment between the sensor array and a structure, the fluid chamber comprising a bellows having a first side and a second side opposite the first side, wherein the first side is a flexible lip forming an opening;
   wherein the fluid chamber further comprises a spacer connected to the second side of the bellows, wherein a portion of the spacer extends into the bellows;
   wherein the fluid chamber comprises a top connected to the spacer and the top has a fluid inlet and at least one fluid outlet; and wherein the fluid chamber is configured to provide a continuous laminar flow of a fluid through the fluid chamber.

2. The inspection system of claim 1, wherein the flexible lip is configured to deform to seal against a surface of the structure.

3. The inspection system of claim 1, wherein the bellows is formed of a polymeric material.

4. The inspection system of claim 1, wherein the top is substantially rigid such that a shape of the top does not deform due to a force applied to the inspection system that deforms the bellows.

5. The inspection system of claim 1, wherein the spacer is configured to maintain a desired distance between the sensor array and a surface of the structure and wherein during inspection of the structure, the bellows is compressed until the flexible lip is even with an end of the spacer.

6. The inspection system of claim 1, wherein the spacer includes a number of standoffs and wherein during inspection of the structure, the bellows is compressed until the flexible lip is even with an end of a standoff of the number of standoffs.

7. The inspection system of claim 1, wherein the bellows further comprises corrugations, and wherein the flexible lip is a widest portion of one corrugation of the corrugations of the bellows.

8. The inspection system of claim 1, wherein the flexible lip is configured to deform in at least two axes.

9. The inspection system of claim 1, wherein the flexible lip is configured to use hydrostatic pressure to provide a force to maintain the bellows against a surface of the structure when fluid is present within the bellows.

10. An inspection system comprising:
a sensor array; and
a fluid chamber containing the sensor array, the fluid chamber comprising:
    a top having a fluid inlet and at least one fluid outlet;
    a substantially rigid spacer connected to the top, wherein the spacer is configured to maintain a desired distance between the sensor array and a surface of a structure; and
    a corrugated skirt having a flexible lip forming an opening, wherein the corrugated skirt is connected to the spacer, and wherein the flexible lip is configured to contact the surface of the structure;
wherein the fluid chamber is configured to provide a continuous laminar flow of a fluid through the fluid chamber.

11. The inspection system of claim 10, wherein the flexible lip is configured to deform a shape of the opening to conform to the surface of the structure.

12. The inspection system of claim 11, wherein the flexible lip is configured to deform the shape of the opening to conform to the surface of the structure such that a greater amount of the fluid exits the fluid chamber through the at least one fluid outlet than through the opening.

13. The inspection system of claim 10, wherein the flexible lip is configured to deform to restrict a flow of the fluid between the flexible lip and the surface of the structure.

14. The inspection system of claim 13, wherein the surface of the structure has a curvature, and wherein the flexible lip is configured to continually deform to contact the surface as the flexible lip moves across the surface of the structure.

15. The inspection system of claim 10, wherein the corrugated skirt is removable such that the corrugated skirt is interchangeable with a second corrugated skirt having a different geometry.

16. A method comprising:
applying a force to an inspection system to maintain a flexible lip of a bellows of the inspection system against a surface of a structure, wherein the bellows has a first side and a second side opposite the first side, wherein the first side comprises the flexible lip and the second side is connected to a spacer, and wherein the spacer is connected to a top;
flowing a fluid into a fluid chamber configured to provide a fluid coupling environment between a sensor array of the inspection system and the surface of the structure while the force is applied to the inspection system, wherein the fluid chamber comprises the top, the spacer, and the bellows, and wherein flowing the fluid creates a continuous laminar flow of the fluid through the fluid chamber; and
inspecting the surface of the structure using the sensor array.

17. The method of claim 16 further comprising:
moving the inspection system along the surface of the structure, wherein at least one of applying the force to the inspection system or a hydrostatic force of the fluid flowing within the fluid chamber maintains contact between the flexible lip and the surface of the structure.

18. The method of claim 17, wherein the surface of the structure has a variable curvature, and wherein the flexible lip of the bellows changes shape as the bellows moves across the surface of the structure.

19. The method of claim 16, wherein applying the force to the inspection system deforms the flexible lip of the bellows to seal the fluid chamber against the structure.

20. The method of claim 16, wherein applying the force to the inspection system deforms the flexible lip to restrict a flow of the fluid between the flexible lip and the surface of the structure such that a greater amount of the fluid exits the fluid chamber through the at least one fluid outlet of the top of the fluid chamber than between the flexible lip and the surface of the structure.

* * * * *